United States Patent [19]

Nikides

[11] Patent Number: 5,793,805

[45] Date of Patent: Aug. 11, 1998

[54] SIGNAL MEASUREMENT SYSTEM AND METHOD FOR MEASURING THE SIGNAL QUALITY OF A RECEIVED RADIO FREQUENCY SIGNAL

[75] Inventor: Robert Stergios Nikides, Carol Stream, Ill.

[73] Assignee: Motorola, Inc., Schaumburg, Ill.

[21] Appl. No.: 572,410

[22] Filed: Dec. 14, 1995

[51] Int. Cl.⁶ .............................. H04B 17/00; H04Q 7/00
[52] U.S. Cl. .................. 375/224; 370/332; 455/67.1; 455/226.2
[58] Field of Search ....................... 375/224, 227, 375/347; 370/332; 455/54.1, 56.1, 67.3, 226.2, 226.3, 226.1, 67.1

[56] References Cited

U.S. PATENT DOCUMENTS

| 5,241,690 | 8/1993 | Larsson et al. | 455/54.1 |
| 5,241,701 | 8/1993 | Andoh | 455/272 |
| 5,491,834 | 2/1996 | Chia | 455/33.2 |
| 5,559,866 | 9/1996 | O'Neill | 455/33.2 |
| 5,630,210 | 5/1997 | Marry et al. | 455/67.3 |

FOREIGN PATENT DOCUMENTS

| 0 454 638 | 2/1991 | France . |
| 0 445 614 A1 | 3/1991 | France . |

OTHER PUBLICATIONS

*The C Users Journal*, The Alpha–Beta Filter, Robert Penoyer, Jul. 1993, pp. 73–86.

*Primary Examiner*—Stephen Chin
*Assistant Examiner*—Betsy L. Deppe
*Attorney, Agent, or Firm*—Kenneth A. Haas

[57] ABSTRACT

An estimated signal quality measurement (224) of a received signal is determined by sampling a first signal quality measurement (208) at a first time and sampling a second signal quality measurement (203) at a second time. The second signal quality measurement being sampled from a different source than the first signal quality measurement. A predicted signal quality value is then calculated at a third time based on the first and second received signal quality measurements. Next, a signal quality value of a signal received at the third time is measured. The predicted signal quality value and the measured signal quality value are then used to estimate a signal quality measurement (224) of the received signals (203, 208).

13 Claims, 4 Drawing Sheets

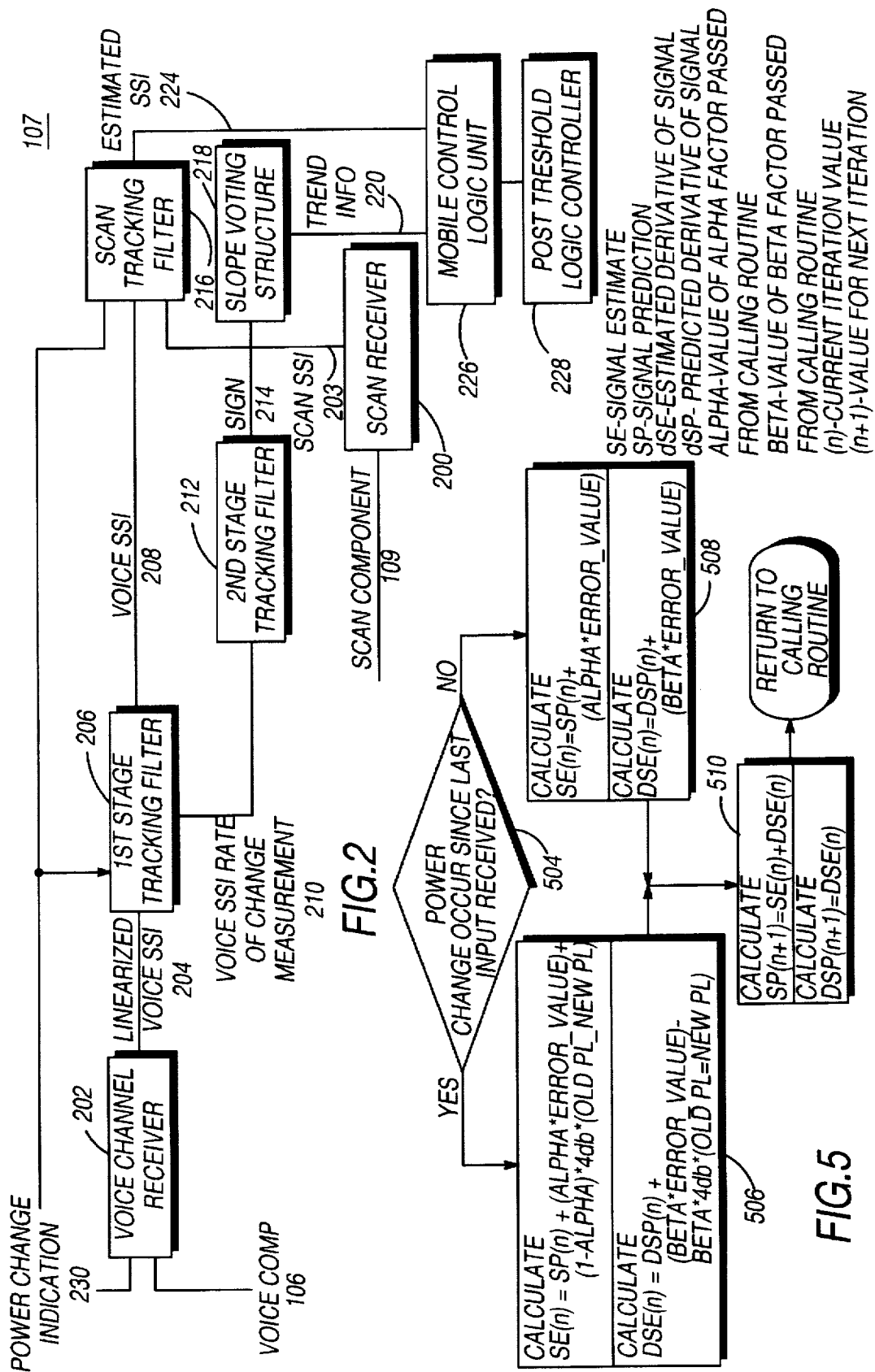

SIGNAL MEASUREMENT SYSTEM AND METHOD FOR MEASURING THE SIGNAL QUALITY OF A RECEIVED RADIO FREQUENCY SIGNAL

FIELD OF THE INVENTION

The invention is generally related to signal measurement, and more particularly to measuring radio frequency signals for use in a communication system.

BACKGROUND OF THE INVENTION

In order to efficiently control power consumption in wireless communication systems such as cellular telephone systems, signals are transmitted to mobile units by the base stations at varying power levels depending upon a signal quality measurement, typically a scan signal strength indicator (SSI). In addition, hand-off control within the wireless communication system is typically predicated upon the transfer of a mobile unit to a new base station having the highest signal quality (e.g., strongest SSI), once the signal quality for the current base station degrades beyond a certain level.

A conventional control method employed in analog base stations relies on a counter to keep track of a number of SSI samples that are above or below a set threshold before taking control action (i.e., hand-off or power control). The threshold and the counter are used to determine when a mobile control action needs to take place. A result of this conventional control method is that by the time control action is taken, the mobile could have considerably exceeded its power control limits, resulting in poor audio quality, increased interference, and potentially dropped calls.

Another problem that exists with the conventional control method is that the scanning method employed to obtain SSI is done on an infrequent basis over a relatively short interval. Infrequently scanning SSI often results in long time periods before any mobile control action can be taken. Further, short measurement intervals may cause inaccuracies in measuring mobile signal strength in a faded environment. These shortcomings may undesirably result in a long delay before any mobile control action is taken. As cell sizes decrease in many wireless communication applications, such as dense urban markets, a long delay interval can cause degraded system performance (such as when entire cells are passed up by the mobile before a hand-off takes place).

Accordingly, there is a need for an improved system to provide faster, more reliable mobile control action.

BRIEF DESCRIPTION OF THE DRAWINGS

FIG. 2 is a block diagram of the mobile controller of FIG. 1.

FIG. 5 is a flow chart of a preferred embodiment of a filtering method performed by the second stage tracking filter and the scan tracking filter of FIG. 2.

DETAILED DESCRIPTION OF THE PREFERRED EMBODIMENTS

Figure 1:
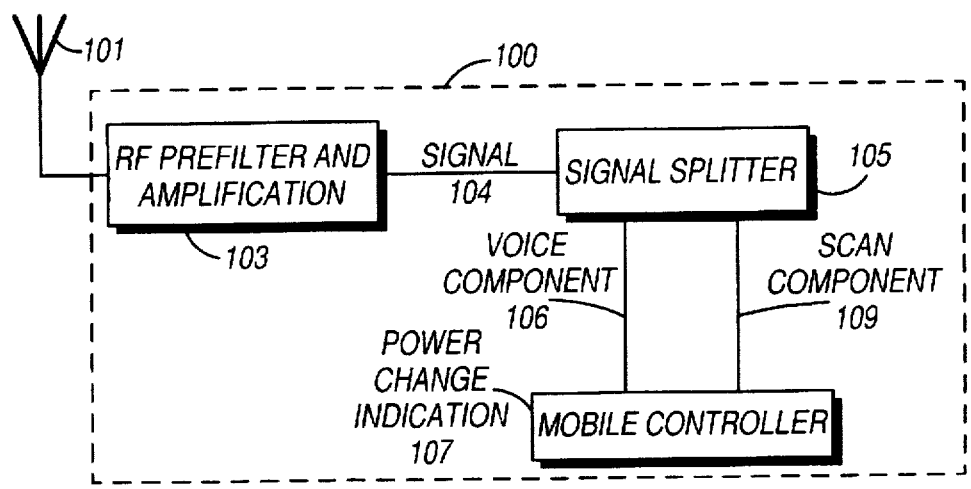
FIG. 1 is a block diagram of a preferred embodiment of a wireless communication system that can utilize the present invention.

The present invention provides a method of producing an estimated signal quality measurement and a method of controlling a mobile unit in a wireless communication system. One form of the invention comprises receiving a first signal quality measurement sampled at a first time and receiving a second signal quality measurement sampled at a second time, the second signal quality measurement originating from a different source than the first signal quality measurement. Next, a predicted signal quality value is calculated at a third time based on the first and second received signal quality measurements. Next, a signal quality value of the received signal at the third time is measured, and finally, an estimated signal quality measurement of the received signals is produced based on the predicted signal quality value and the measured signal quality value.

Another form of the invention comprises receiving a signal from the mobile unit and sampling the received signal to produce a plurality of signal quality values. Next, the plurality of signal quality values is analyzed to produce a rate of change measurement data in the signal quality value. Next, trend information from the rate of change measurement data is derived and compared to at least one of signal quality values to produce a comparison result. Finally, a mobile control command based on the trend information and the comparison result is initiated.

Another form of the invention comprises a signal measurement system comprising a first receiver for detecting a received signal and producing a first signal quality measurement of the received signal wherein the first signal quality measurement comprises a calibrated measurement. A second receiver for detecting the received signal and producing a second signal quality measurement. Finally, a filter is provided, responsive to the first and second receivers, the filter producing an estimated signal quality measurement based on the first and second signal quality measurements.

Another form of the invention comprises a method of tracking a received signal at a communication unit of a wireless communication system comprising the steps of detecting a received signal at the communication unit, receiving an indication of a power level step change in the received signal, the step change having a predetermined magnitude, determining a signal estimate of the received signal based on the predetermined magnitude of the step change, calculating a rate of change of the signal estimate, and finally, tracking the received signal based on the signal estimate and the rate of change of the signal estimate.

Another form of the invention comprises a method of controlling a mobile unit in a wireless communication system comprising the steps of detecting a received signal from the mobile unit, determining a signal quality estimate of the received signal, comparing the signal quality estimate of the received signal to a threshold to produce a comparison result, sampling the received signal to produce a plurality of samples, calculating a plurality of slope measurements based on the plurality of samples of the received signal, counting a first number of the plurality of slope measurements having a first value, counting a second number of the plurality of slope measurements having a second value, determining a slope voting measurement based on a comparison between the first number and the second number, and finally, initiating a mobile control command based on the slope voting measurement and the comparison result.

Another form of the invention comprises a receiving stage for use in a communication system comprising a signal measurement system comprising a first receiver detecting a received signal and producing a first signal quality measurement, a second receiver detecting the received signal and producing a second signal quality measurement, and a filter responsive to the first and second receivers, the filter producing an estimated signal quality measurement based on the first and second signal quality measurements. The signal measurement system also comprising a slope voting module and a control logic unit responsive to the signal measurement system and the slope voting module.

The invention itself, together with its intended advantages will best be understood by reference to the following detailed description, taken in conjunction with the accompanying drawings.

FIG. 1 illustrates a preferred embodiment of a wireless communication system 100. The wireless communication system 100 is preferably a cellular system such as that defined by the Cellular System Mobile Station-Base Station Compatibility Standard of the Electronic Industry Association/Telecommunications Industry Association (EIA/TIA) standard 553. (EIA/TIA can be contacted at 2001 Pennsylvania Ave. NW Washington DC 20006). The wireless communication system 100 includes an antenna 101, a RF prefilter and amplifier 103, a signal splitter 105, and a mobile controller 107 and is preferably implemented in a base station, such as a Motorola HDII™ base station. The mobile controller 107 is preferably a controller such as those found in Motorola base station model B45HDD0287AF.

During operation, a signal, such a transmitted carrier from a mobile communication unit, is received by antenna 101 and detected by RF prefilter and amplifier 103. RF prefilter and amplifier 103 filters and amplifies the received signal and outputs the amplified, filtered signal 104 to signal splitter 105. Signal splitter 105 splits the RF signal into a voice component 106 and a scan component 109. Both voice component 106 and scan component 109 are input into a mobile controller 107 in order to initiate control action within the communication system 100.

Referring to FIG. 2, a block diagram of a preferred embodiment of mobile controller 107 is illustrated. Controller 107 includes of a scan receiver 200, a voice receiver 202, a first stage tracking filter 206, a second stage tracking filter 212, a scan tracking filter 216, a slope voting structure 218, a mobile control logic unit 226, and a post threshold logic controller 228. In the preferred embodiment, the voice channel receiver 202 and the scan receiver 200 are connected to antenna 101. First stage tracking filter 206 is connected to voice channel receiver 202; and the second stage tracking filter 212 is connected to the first stage tracking filter 206. Scan tracking filter 216 is connected to first stage tracking filter 206 and scan receiver 200. Slope voting structure 218 is connected to the second stage tracking filter 212. The mobile control logic unit 226 is connected to both the slope voting structure 218 and the scan tracking filter 216. Finally, a post threshold logic controller 228 is connected to the mobile control logic unit 226. During operation, the voice channel receiver 202 and the scan receiver 200 each receive the voice component 106 and the scan component 109 respectively of the signal 104. The scan receiver 200 samples the scan component 109 to produce a scan SSI 203 and the voice channel receiver 202 samples the voice component 106 to produce a linearized voice SSI 204. In the preferred embodiment, the linearized voice SSI 204 is produced by sampling the voice component 106, at the voice receiver 202, at a higher rate, preferably at least 10 times faster, than the scan SSI 203. Preferably, the voice channel receiver 202 samples every 125 ms and the scan receiver 200 samples every 3.5 seconds. The linearized voice SSI 204 is received at the first stage tracking filter 206 which provides a voice SSI 208 preferably a voice SSI of the mobile communicating with the antenna 201, and as a voice SSI rate of change measurement 210. In the preferred embodiment, the first stage tracking filter 206 is a modified Alpha-Beta type filtering system. Alpha-Beta filers are described in *The Alpha-Beta Filter*, Robert Penoyer, THE C USERS JOURNAL, July 1993, which is incorporated by reference herein.

The voice SSI rate of change measurement 210 is then fed to the second stage tracking filter 212, which removes noise from the voice SSI rate of change measurement 210. Again, in the preferred embodiment, the second stage tracking filter 212 is an Alpha-Beta type filtering system. In the preferred embodiment, the output from the second stage tracking filter 212 is the sign 214 (either positive or negative) of the voice SSI rate of change measurement 210. The sign 214 is shifted onto a slope voting structure 218 so that the slope voting structure 218 contains the last N signs 214, (preferably 16) measured by the second stage tracking filter 212. The N signs 214 within the slope voting structure 218 are then analyzed to determine if a trend exists in the signs 214. Trend information 220 for the N signs is then output from the slope voting structure 218 into the mobile control logic unit 226. In the preferred embodiment, the trend information 220 indicates that a positive or a negative trend exists if a lower limit, preferably twelve out of the last 16 signs 214 of the SSI rate of change estimate 210 are all positive or negative, respectively. Another method that may be employed to determine if a trend exists in the signs 214 is to predicate the trend information 220 on a ratio of the number of positive/negative signs 214 to N. When utilizing this method in the preferred embodiment, it is determined that a trend exists if a ratio such as 2/3 to 3/4 is obtained in the ratio of the number of positive/negative signs 214 to N.

The voice SSI 208 is input along with the scan SSI 203 into the scan tracking filter 216. The scan tracking filter 216 is a modified multi-input Alpha-Beta type filter. Further details of the scan tracking filter 216 are described in reference to FIG. 3 and FIG. 5. The scan tracking filter 216 outputs an estimated SSI 224 which is then passed to the mobile control logic unit 226. In the preferred embodiment, the mobile control logic unit 226 compares the estimated SSI 224 with the trend information 220. If the estimated SSI 224 exceeds a threshold and the trend information 220 agrees with the direction of the threshold, an appropriate control action is initiated. By utilizing both the trend information 220 and a threshold in determining when control action should take place, more reliable control action is achieved. In addition by utilizing both voice SSI 208 and scan SSI 203 to determine when to take control action, the benefits of each can be taken advantage of, while minimizing the negative effects of using each independently. For example, the problem of using less accurate voice SSI 208 is reduced by also utilizing more accurate scan SSI 203, and the problems of using slower sampled scan SSI 203 is reduced by also utilizing the faster sampled voice SSI 208.

If the estimated SSI 224 exceeds a threshold and the trend information 220 does not agree with the direction of the threshold then the estimated SSI 224 is passed onto existing post threshold confidence logic. In the preferred embodiment, using the N sign samples allows control action to be taken based on a slope history. In addition, passing the estimated SSI 224 to the post threshold confidence logic allows for control actions to be initiated when less slope confidence exists to initiate control action.

As shown in FIG. 2, the scan tracking filter 216 has as its inputs a first signal quality measurement and a second signal quality measurement. In the preferred embodiment, the first signal quality measurement is voice SSI 208, and the second signal quality measurement is scan SSI 203. The scan tracking filter 216 contains an interleaver (not shown) that takes the two inputs and outputs either the voice SSI 208 or the scan SSI 203 in the order they were received by the interleaver (now shown). In particular, the interleaver (now shown) is used to handle the multiple inputs to the scan tracking filter 216. The error calculation of the standard Alpha-Beta filter is modified by a multi-branch decision process based upon origination of the current SSI sample and the previous SSI sample. In the preferred embodiment, there are only three possible current SSI and previous SSI combinations since the voice SSI 208 is updated at least 10 times as fast as the scan SSI 203. These combinations are: 1) both voice SSI 208 as the current and the previous sample; 2) voice SSI 208 as the current sample and scan SSI 203 as the previous sample; and 3) scan SSI 203 as the current sample and voice SSI 208 as the previous sample. By utilizing both the voice SSI 208 (which scans at a much faster rate than the scan SSI 203), and the scan SSI 203, reliable signal strength estimation can be achieved at a much faster rate than the prior-art method of utilizing only the slower scan SSI 203.

If both the current and the previous inputs originated from the voice SSI 208, then the Alpha-Beta filter error is set to the difference between the current and the previous voice SSI 208. In this case, since the linearized SSI values 208 have already been smoothed by the first stage tracking filter 206, a filter value (alpha value) is set to about 1.0, or equivalently about 100% of the error is used to update the predicted value of the scan SSI 203.

If the current measurement is from the scan SSI 203, and the previous measurement is from the voice SSI 208, the error is set to the difference between the measured scan SSI 203 and a predicted value of the scan SSI 203. A unique alpha value is provided for this branch (scan alpha value), and is set depending upon the relative accuracy of the SSI measurement processes. In the preferred embodiment an alpha value of 0.90 (90%) is used in this case.

The last branch is entered when the current measurement is from the voice SSI 208 and the previous measurement is from the scan SSI 203. In this instance, the error calculation starts by taking the difference between the current voice SSI 208 and the previous voice SSI 208. This difference is then added to the estimated SSI 224 obtained at the previous voice SSI 208 iteration. This results in a current absolute voice SSI measurement. The difference between the current absolute voice SSI measurement and the current predicted value of the estimated SSI 224 now becomes the error. A third voice alpha value is used at this point based again upon the relative accuracy of the SSI measurement process. In the preferred embodiment, the alpha value is 0.90 (90%). In other words, since the previous measurement was from an absolute reference (scan SSI 203) and the new measurement is from a non-absolute reference (voice SSI 208), an absolute measurement value is used to calculate the prediction error. This is accomplished by taking the difference of the current and previous voice SSI 208 measurements and adding it to the best known absolute reference at the time of the previous measurement, which is the estimated SSI 224.

Figure 3:
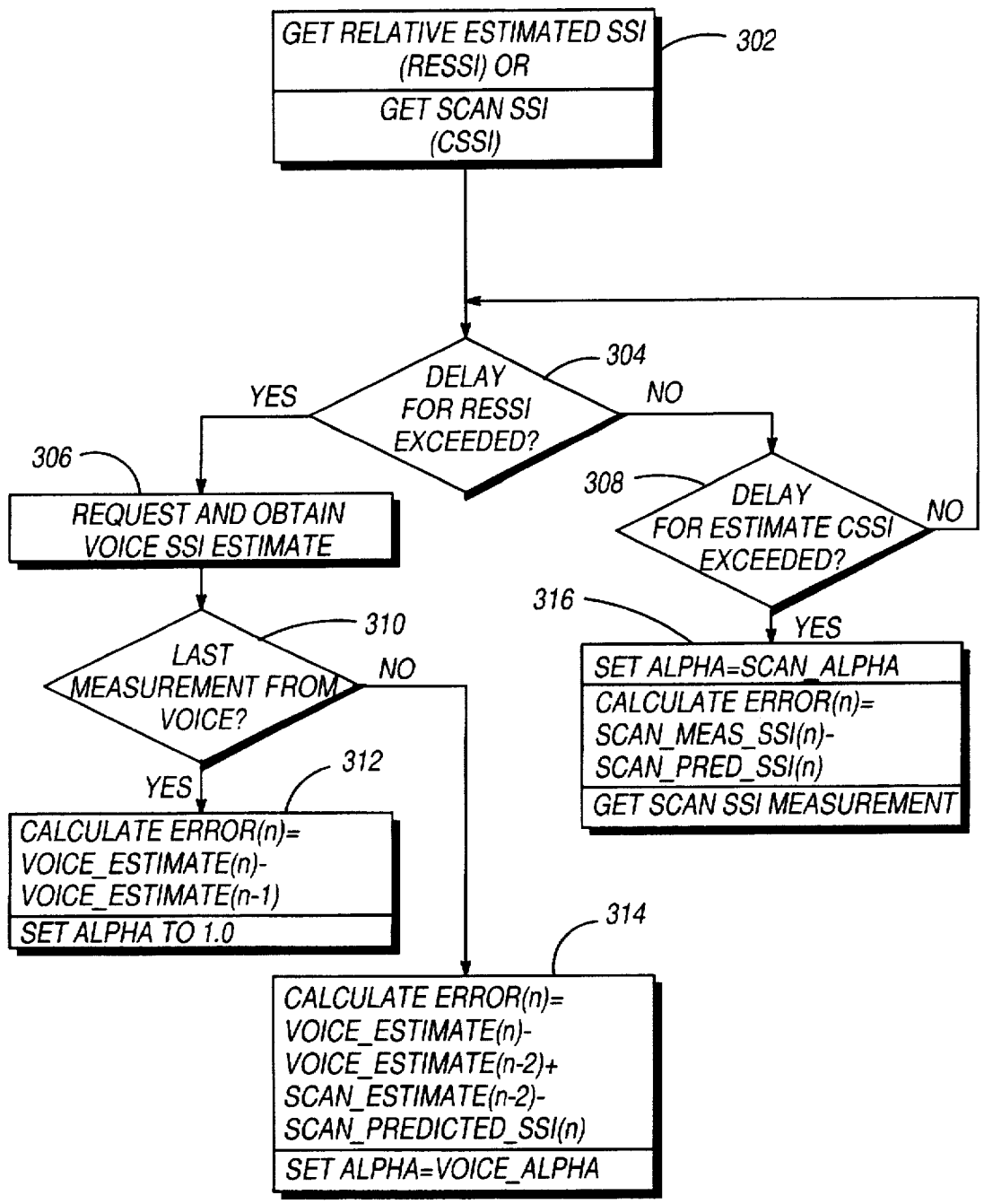
FIG. 3 is a flow chart of a preferred embodiment of a method of scanning within the scan tracking filter of FIG. 2.

A more detailed description of the preferred method of filtering in the scan tracking filter 216 is provided in reference to the flow chart in FIG. 3. As shown at 302, the filter 216 receives the (N-1) measurement of the Alpha-Beta filter, which can be either the voice SSI 208 or the scan SSI 203, depending upon the particular input first presented to the filter. Next, at 304, it is determined if a delay time for the voice SSI 208 has been exceeded. If the voice SSI 208 delay time has been exceeded, then at 306, the current voice SSI 208 is obtained, which becomes the Nth measurement in the Alpha-Beta filtering scheme and it is determined if the (N-1) measurement was voice SSI 208 or scan SSI 203 at 310. If, at 310, it is determined that the (N-1) measurement was voice SSI 208, then at 312, the parameters of the Alpha-Beta filtering scheme are set to:

ERROR(N)=VOICE_SSI_ESTIMATE(N)–VOICE_SSI_ESTIMATE(N-1)

ALPHA=1.0

If, at 310, it is determined that the (N-1) measurement was a scan SSI 203, then at 314, the parameters of the Alpha-Beta filtering scheme are set to:

---

ERROR(N) = VOICE_SSI_ESTIMATE(N) –
VOICE_SSI_ESTIMATE(N-2) + SCAN_SSI_ESTIMATE(N-2) –
SCAN_SSI_PREDICTED(N)
ALPHA = VOICE_ALPHA

---

If at 304, the delay time for the voice SSI 208 has not been exceeded, then it is determined if the delay time for the scan SSI 203 has been exceeded at 308. If the delay time has been exceeded for the scan SSI 203, then, at 316, the parameters of the Alpha-Beta filtering scheme are set to:

ERROR(N)=SCAN_SSI_MEASURED(N)–SCAN_SSI_PREDICTED(N)

ALPHA=SCAN_ALPHA otherwise processing continues back at 304.

Figure 4:
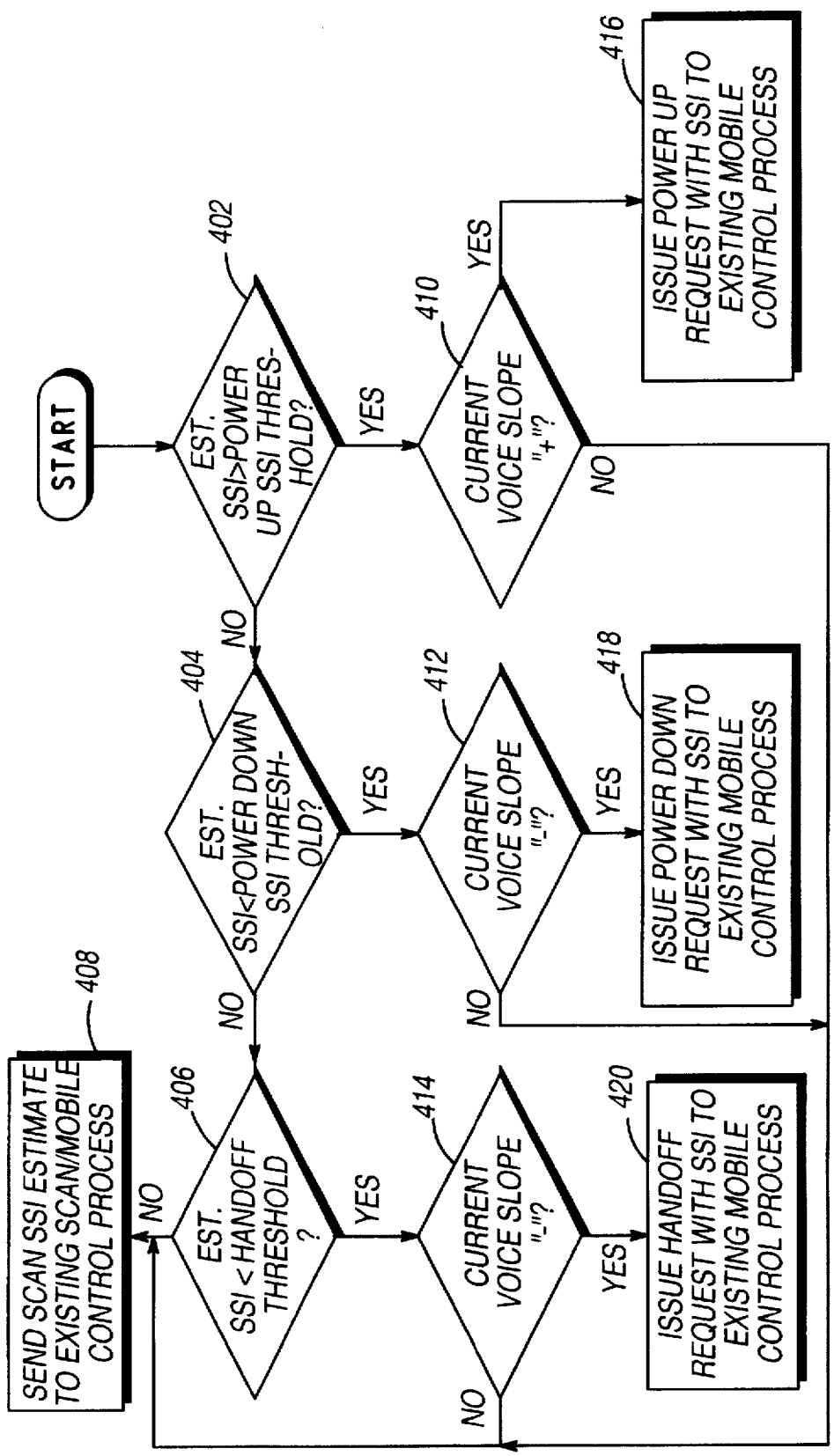
FIG. 4 is a flow chart of a preferred embodiment of the mobile control logic unit of FIG. 2.

FIG. 4 is a flow chart of a preferred embodiment of the mobile control logic unit 226. At step 402, the estimated SSI 224 is compared to a power up threshold level. If the estimated SSI 224 is above the threshold level then, at step 410, it is determined if the trend information 220, such as the current slope, is positive. If the trend information 220 is positive, then at step 416 a power up request is issued. If the trend information 220 is not positive, then at step 408, the estimated SSI 224 is sent to the post threshold logic controller 228.

If, at step 402, it is determined that the estimated SSI 224 is not above the power up threshold, then at step 404, it is determined if the estimated SSI 224 is below the power down threshold. If the estimated SSI 224 is found to be below the power down threshold, then at step 412, it is determined if the trend information 220 is negative. If the trend information 220 is negative, then at step 418, a power down request is issued. If the trend information 220 is not negative, then at step 408, the estimated SSI 224 is sent to the post threshold logic controller 228.

If the estimated SSI 224 is neither above the power-up threshold, nor below the power-down threshold, then at step 406, it is determined if the estimated SSI 224 is below the hand-off threshold. If the estimated SSI 224 is below the hand-off threshold, then it is determined if the trend information 220 is negative at step 414. If the trend information 220 is found to be negative, then at step 420, a hand-off request is issued. If the trend information 220 is not negative, then at step 408, the estimated SSI 224 is sent to the post threshold logic controller 228.

FIG. 5 is a flow chart of a preferred method of filtering the first stage tracking filter 206 and scan tracking filter 216 to accommodate for power level changes. Both the first stage tracking filter 206 and the scan tracking filer 216 utilize an Alpha-Beta type filter which is modified to accommodate for mobile power changes. By compensating for the predetermined power increases, the signal can be tracked at a faster rate.

Referring now to the first stage tracking filter 206. In conventional systems, the voice SSI rate of change measurement 210 would change by a step function when a power change has occurred and this change would take a tracking filter several iterations in which to adjust.

At step 504, it is determined if an indication of a power change 230 has occurred since the last input was received. If an indication of a power change 230 has occurred, the voice SSI 208 (SE(n) in FIG. 5), and the voice SSI rate of change measurement 210 (dSE(n) in FIG. 5) are calculated via the following formulas at step 506:

```
VOICE_SSI(N) = PREDICTED_VOICE_SSI(N) + (ALPHA *
ERROR(N)) + (1-ALPHA)*4db * (MOBILE_POWER_LEVEL(N-1) −
MOBILE_POWER_LEVEL(N))
``` where ERROR(N) is the difference between the linearized voice SSI(N) 204 and the current prediction of the voice SSI 208 and PREDICTED_VOICE_SSI(N) corresponds to SP(n) in FIG. 5.

```
VOICE_SSI_RATE_OF_CHANGE(N) =
PREDICTED_RATE_OF_CHANGE(N) + (BETA * ERROR(N)) −
BETA * 4db * (MOBILE_POWER_LEVEL(N-1) −
MOBILE_POWER_LEVEL(N))
``` and, at step 510, the predicted values are calculated using the standard Alpha-Beta technique.

If, at step 504, an indication of a power change 230 has not occurred since the last input, the voice SSI 208, and the voice SSI rate of change measurement 210 are calculated via the following formulas at step 508:

```
VOICE_SSI(N)=PREDICTED_VOICE SSI(N)+(ALPHA *
ERROR(N))

VOICE_SSI_RATE_OF_CHANGE(N)=PREDICTED_RATE_
OF_CHANGE(N )+(BETA * ERROR(N))
```

At step 510, the predicted values are calculated using the standard Alpha-Beta technique. By offsetting the voice SSI 208 output from the Alpha-Beta filter, and compensating the weight factors for the voice SSI rate of change measurement 210, the continuity of the information is maintained.

Referring to the scan tracking filter 216, the scan tracking filter 216 utilizes an Alpha-Beta type filter which is modified to accommodate for mobile power changes. In conventional systems, the scan SSI 203 or the voice SSI 208 would change by a step function when a power change has occurred and this change would take a tracking filter several iterations to adjust too.

At step 504, it is determined if a power change has occurred since the last input was received. If a power change has occurred, estimated SSI 224 and the estimated SSI 224 rate of change is calculated by the following formulas:

```
ESTIMATED_SSI(N) = PREDICTED_ESTIMATED_SSI(N) +
(ALPHA * ERROR(N)) + (1-ALPHA)*4db *
(MOBILE_POWER_LEVEL(N-1) − MOBILE_POWER_LEVEL(N))
``` where ERROR(N) is calculated as described in reference to FIG. 3.

```
RATE_OF_CHANGE_IN_ESTIMATED_SSI(N) =
PREDICTED_RATE_OF_CHANGE_IN_ESTIMATED_SSI(N) +
(BETA * ERROR(N)) − BETA * 4db *
(MOBILE_POWER_LEVEL(N-1) − MOBILE_POWER_LEVEL(N))
``` and, at step 510, the predicted values are calculated using the standard Alpha-Beta technique.

If, at step 504, a power change has not occurred since the last input, the estimated SSI 224, and the estimated SSI 224 rate of change measurement are calculated via the following formulas at step 508:

```
ESTIMATED_SSI(N) = PREDICTED_ESTIMATED_SSI(N) +
(ALPHA * ERROR(N))
RATE_OF_CHANGE_IN_ESTIMATED_SSI(N) =
PREDICTED_RATE_OF_CHANGE_IN ESTIMATED_SSI(N) +
(BETA * ERROR(N))
```

At step 510, the predicted values are calculated using the standard Alpha-Beta technique. By offsetting the estimated SSI 224 output from the Alpha-Beta filter the continuity of the information is maintained.

Figure 6:
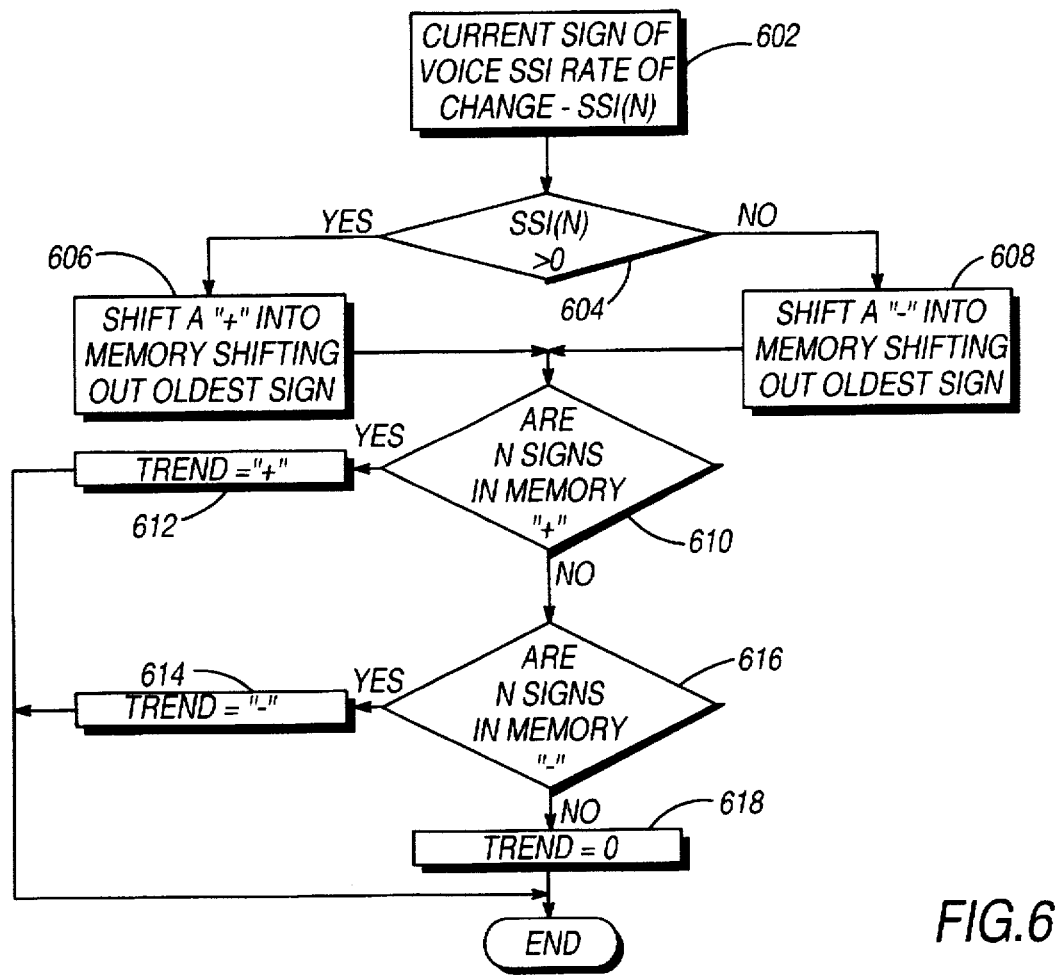
FIG. 6 is a flow chart of a preferred embodiment of slope voting.

FIG. 6 shows the preferred embodiment of performing slope voting within the slope voting structure 218. At step 602, the current sign of the voice SSI rate of change 210 is input into the slope voting structure 218. At step 604, if the voice SSI rate of change 210 is determined to be positive, then at 606, a value indicating a "+" is shifted into memory, shifting out the oldest sign in memory. At 604, if the voice SSI rate of change 210 is determined to be negative, then at 608, a value indicating a "−" is shifted into memory, shifting out the oldest sign in memory. At 610 it is determined if a predetermined number of signs in memory are "+". If they are, then at 612, the trend information 220 is set to "+". If, at 610, it is determined that a predetermined number of signs in memory are not "+", then at 616, it is determined if a predetermined number of signs in memory are "−". If a predetermined number of signs in memory are "−" then at 614, the trend information 220 is set to "−" otherwise, at 618, the trend information is set to "0".

The invention, in its broader aspects, is not limited to the specific details, representative apparatus, and illustrative examples shown and described above. Various modifications and variations can be made to the above specification without departing from the scope or spirit of the present invention, and it is intended that the present invention cover all such modifications and variations provided they come within the scope of the following claims and their equivalents.

What is claimed is:

1. A method of producing an estimated signal quality measurement of a received signal comprising the steps of:
    receiving a first signal quality measurement sampled at a first time;
    receiving a second signal quality measurement sampled at a second time;
    calculating a predicted signal quality value based on the first and second received signal quality measurements;
    measuring a signal quality value of the received signal at a third time; and
    producing an estimated signal quality measurement of the received signal based on the predicted signal quality value and the measured signal quality value.

2. The method of claim 1 further comprising the step of interleaving the first and the second received signal quality measurements prior to calculating the predicted signal quality value.

3. The method of claim 1 further comprising the step of producing an error value based on a difference between the predicted signal quality value and the measured signal quality value.

4. The method of claim 3, wherein the error value is based upon an order of receiving the first signal quality measurement and the second signal quality measurement.

5. The method of claim 1 further comprising the step of producing a filter value based on a predetermined accuracy of the first and the second signal quality measurements.

6. The method of claim 1 wherein the measured signal quality value is produced by one of a first sampling device producing the first signal quality measurement and a second sampling device producing the second sampling measurement.

7. The method of claim 1 wherein at least one of the signal quality measurements is a signal strength indicator.

8. The method of claim 1 further comprising the steps of:
producing rate of change measurement data in the first signal quality measurement;
deriving trend information from the rate of change measurement data;
comparing the estimated signal quality measurement to a threshold to produce a comparison result; and
initiating a mobile control command based on the trend information and the comparison result.

9. The method of claim 8 wherein the mobile control command comprises a transmit power control command.

10. The method of claim 8 wherein the mobile control command comprises a hand-off command.

11. A signal measurement system comprising:
a first receiver sampling a received signal at a first sampling rate and producing a first signal strength indication measurement of the received signal;
a second receiver sampling the received signal at a second sampling rate, the second sampling rate exceeding the first sampling rate, and producing a second signal strength indication measurement; and
a filter responsive to the first and second receivers, the filter producing an estimated signal quality measurement based on the first and second signal strength indication measurements.

12. The apparatus of claim 11, wherein the first receiver comprises a scanning receiver.

13. The system of claim 11, wherein first signal strength indication measurement has a greater degree of accuracy than the second signal strength indication measurement.

* * * * *